United States Patent [19]

Balk

[11] Patent Number: 5,707,103
[45] Date of Patent: Jan. 13, 1998

[54] STORABLE AND REMOVABLE SEAT ASSEMBLY

[75] Inventor: Chad Balk, Birmingham, Mich.

[73] Assignee: Lear Corporation, Southfield, Mich.

[21] Appl. No.: 775,630

[22] Filed: Mar. 25, 1997

[51] Int. Cl.$^6$ .................................................. A47C 1/12
[52] U.S. Cl. ..................... 297/13; 297/331; 297/344.22; 297/378.12
[58] Field of Search ....................... 297/13, 14, 483, 297/378.1, 344.21, 344.22, 331, 440.1, 378.12; 296/65.1

[56] References Cited

U.S. PATENT DOCUMENTS

| | | | |
|---|---|---|---|
| 1,639,371 | 8/1927 | Freeman | 296/65.1 X |
| 2,035,451 | 10/1936 | Bell . | |
| 2,266,200 | 12/1941 | Hedley | 296/65.1 |
| 2,621,708 | 11/1952 | Luce, Jr. . | |
| 2,797,732 | 1/1957 | Thomas . | |
| 3,059,964 | 10/1962 | Hoppe et al. | 297/331 X |
| 3,131,964 | 5/1964 | Reed | 297/344.22 X |
| 3,955,847 | 5/1976 | Schiowitz | 296/65.1 |
| 4,457,551 | 7/1984 | Anthony | 296/65.1 |
| 4,846,498 | 7/1989 | Föhl | 297/483 X |
| 4,955,973 | 9/1990 | Provencher . | |
| 4,978,158 | 12/1990 | Kubo et al. | 296/65.1 |
| 4,993,666 | 2/1991 | Baymak et al. | 297/331 X |
| 5,443,239 | 8/1995 | Laporte | 296/65.1 X |
| 5,489,141 | 2/1996 | Strausbaugh et al. . | |

FOREIGN PATENT DOCUMENTS 639855 7/1928 France .................................. 297/13

*Primary Examiner*—Milton Nelson, Jr.
*Attorney, Agent, or Firm*—Howard & Howard

[57] ABSTRACT

A rear seat assembly (10) for providing additional cargo space capable of being moved from a seating position to a stored position or removed from a vehicle. The seat assembly (10) is comprised of a seat bottom (12) and a seat back (14) interconnected by a locking hinge (16). The seat bottom (12) includes a clevis (26), a support bracket (22) and a latch (20) for supporting the seat bottom (12) on a vehicle floor (24) when the seat assembly (10) is in the seating position. In addition, the clevis (26) allows the seat assembly (10) to be moved from the seating position to an upright folded position. A support shaft (28) is mounted to the clevis (26) and removably received in a support housing (34) mounted on the vehicle floor (24) to allow the seat assembly (10) to rotate to the stored position or be removed from the vehicle. The latch (20) also secures the seat bottom (12) to the vehicle floor (24) when in the seating position and secures the seat bottom (12) to a vehicle wall (50) when in the stored position. A release mechanism (60) mounted to the seat bottom (12) interconnects the locking hinge (16) and latch (20) to release the latch (20) and locking hinge (16) and allow movement from the seating position to the upright folded position. A seat belt buckle assembly (64) is mounted to the seat bottom (12).

18 Claims, 2 Drawing Sheets

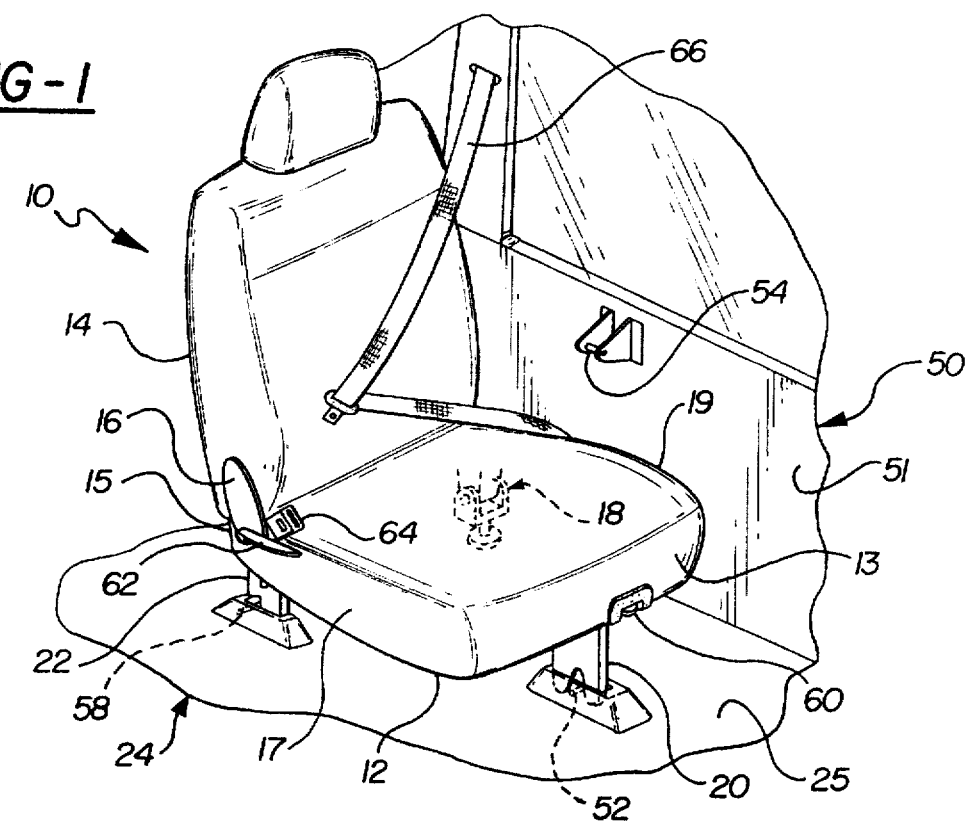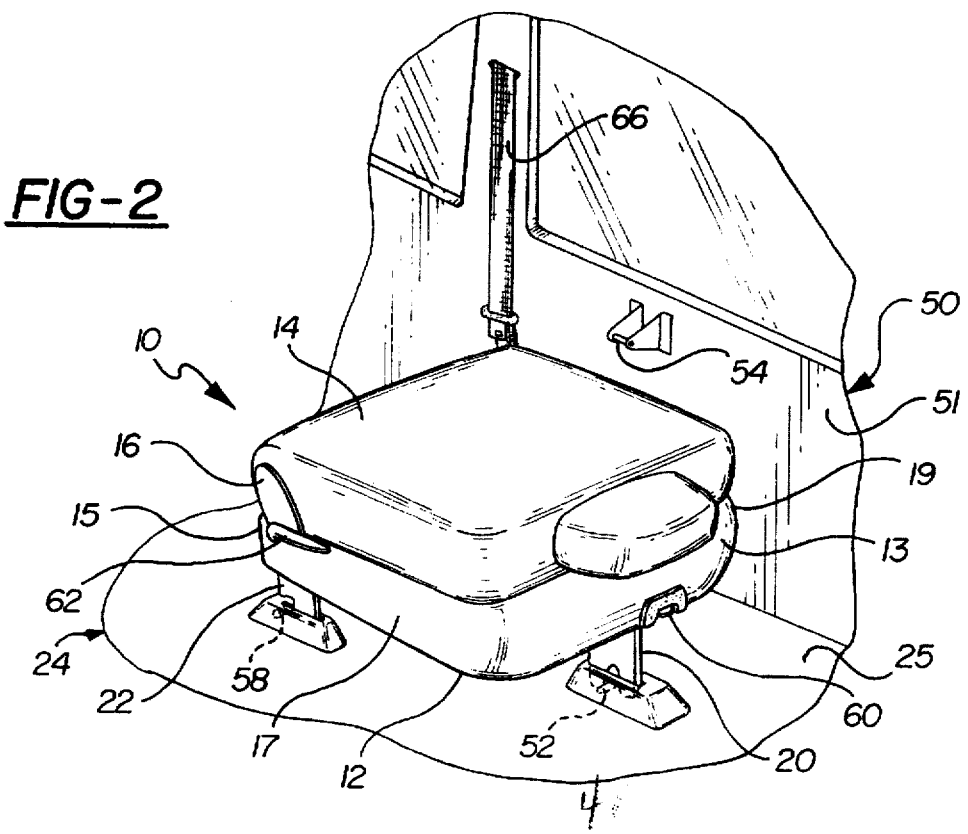

STORABLE AND REMOVABLE SEAT ASSEMBLY

TECHNICAL FIELD

The subject invention relates to a storable and removable seat assembly. More specifically, the subject invention relates to an automotive storable and removable rear seat assembly used in vans and utility vehicles.

BACKGROUND OF THE INVENTION

In automotive vehicles used for transporting passengers and/or cargo, such as vans and utility vehicles, there is the need to have flexibility between transporting additional seated passengers and transporting additional cargo. Therefore, it is desirable to have a seat assembly for providing additional cargo space, which can be quickly and easily moved between a seating position and a stored position and vice versa, as well as be removed from the vehicle.

SUMMARY OF THE INVENTION AND ADVANTAGES

A seat assembly comprising a generally horizontal seat bottom and a generally vertical seat back operatively connected to the seat bottom for defining a seating position. A support joint is attached to the seat bottom for supporting the seat bottom on a support structure and for allowing the seat bottom and the seat back to move between the seating position and an upright folded position with the seat bottom in a generally vertical plane adjacent the seat back and for rotating the seat bottom in unison with the seat back about a vertical axis to a transverse stored position. A latch is secured to the seat bottom for latching the seat bottom to the support structure when the seat bottom is in the seating position and for latching the seat bottom to a storage structure when the seat back and seat bottom are in the transverse stored position. A support housing removably receives and mounts the support joint to the vehicle floor.

Accordingly, the subject invention provides a seat assembly which can be quickly and easily moved between a seating position and a stored position and vice versa, as well as can be removed from the vehicle.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the seat assembly in the seating position;

FIG. 2 is a perspective view of the seat assembly in the forward folded position;

DETAILED DESCRIPTION OF THE PREFERRED EMBODIMENT

Figure 3:
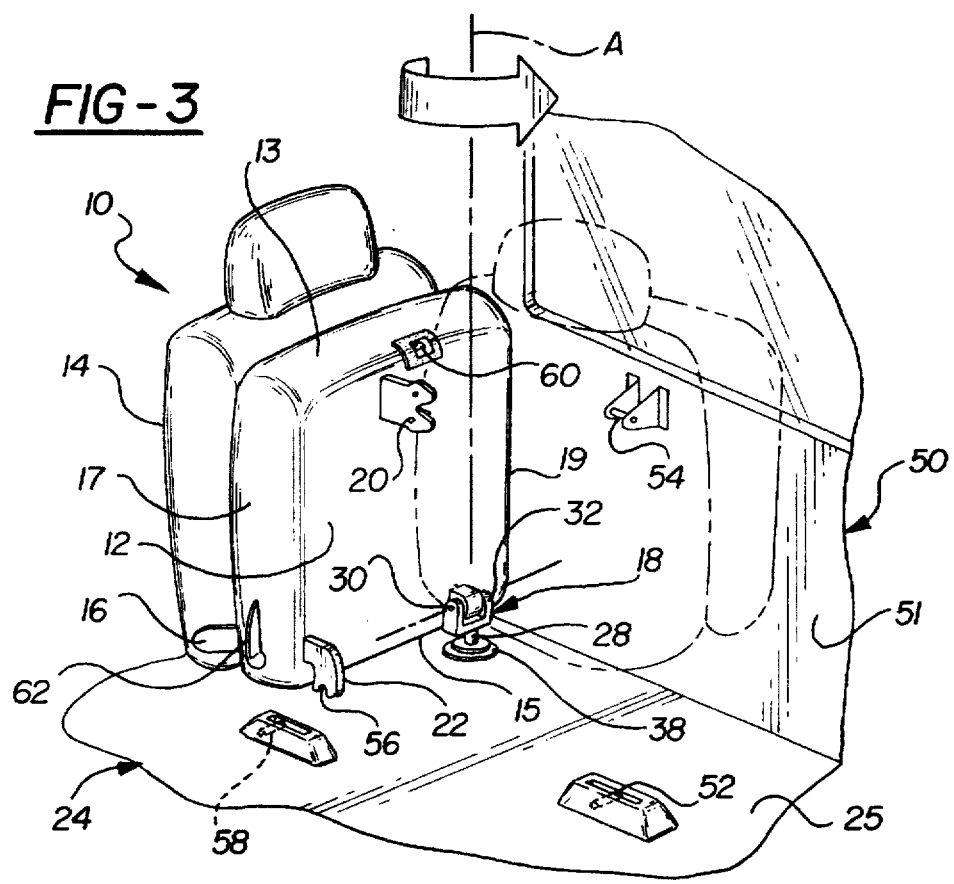
FIG. 3 is a perspective view of the seat assembly in the upright folded position, and showing in phantom, the seat assembly in the stored position.
Figure 4:
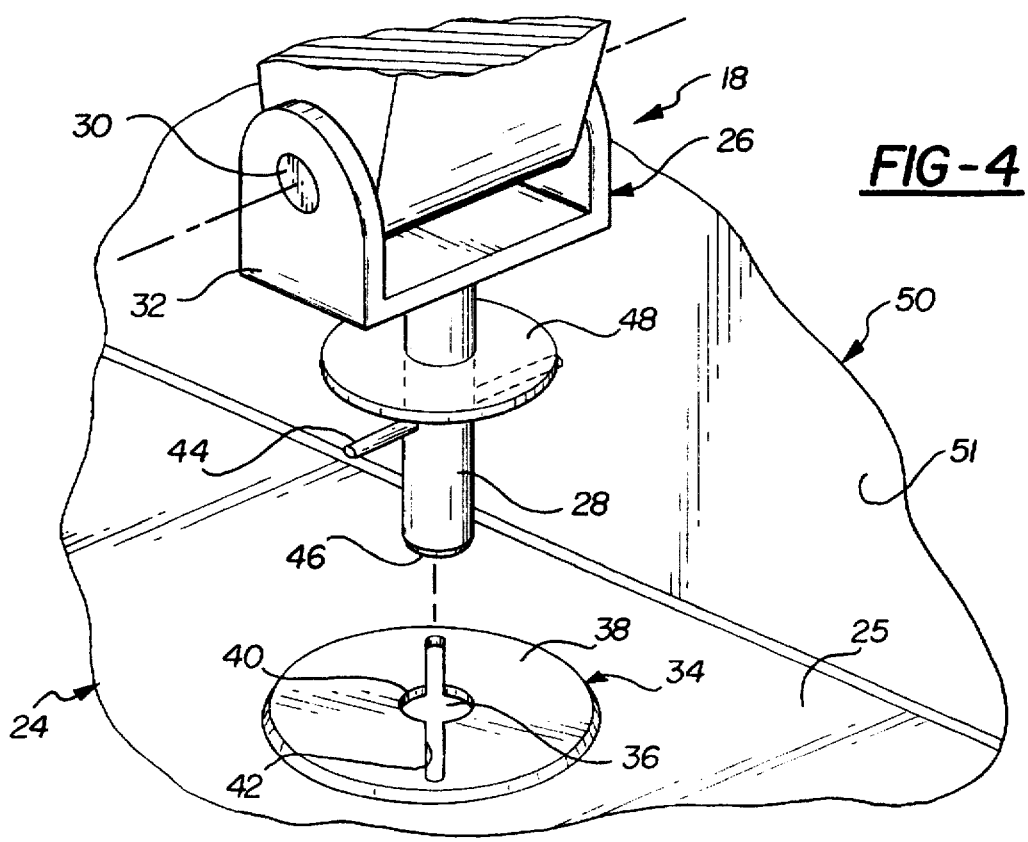
FIG. 4 is a perspective view of the support joint shown in greater detail.

Referring to the Figures, wherein like numerals indicate like or corresponding parts throughout the several views, a seat assembly is generally shown at 10.

The seat assembly 10 includes a generally horizontal seat bottom 12 and a generally vertical seat back 14 operatively connected to said seat bottom 12 for defining a seating position as shown in FIG. 1. A locking hinge 16, of a type known to one skilled in the art, interconnects the seat back 14 and the seat bottom 12 allowing the seat back 14 to pivot to a forward folded position with the seat back 14 in a generally horizontal position adjacent to the seat bottom 12 as shown in FIG. 2. The locking hinge 16 further provides a means of locking the seat back 14 and seat bottom 12 in the seating and forward folded positions.

Each of the seat bottom 12 and the seat back 14 include a rigid seat frame structure for supporting a resilient contoured foam pad commonly made of polyethylene and covered by an upholstery trim cover such as cloth, leather or vinyl.

The seat bottom 12 includes a front portion 13 and a rear portion 15 with opposing inboard 17 and outboard 19 side portions interconnecting the front 13 and rear 15 portions. A support joint 18, a latch 20 and a support bracket 22 are attached to the seat bottom 12 for supporting the seat bottom 12 on a support structure 24 when the seat assembly 10 is in the seating or forward folded positions. In the preferred embodiment, the support structure 24 comprises a vehicle floor 25 known to one skilled in the art as having sufficient structure for supporting the seat assembly 10 under normal vehicle operating conditions. The support joint 18 is mounted in an outboard corner adjacent the rear 15 and the outboard side 19 portions. The latch 20 is mounted adjacent to the front portion 13 and between the inboard 17 and outboard 19 side portions. The support bracket 22 is mounted to the seat bottom 12 in an inboard corner adjacent the rear 15 and the inboard side 17 portions.

The support joint 18 includes a clevis 26 and a support shaft 28. The clevis 26 includes a pin 30 supported by the seat bottom 12 and a U-shaped shackle 32 pivotally mounted to the pin 30 for allowing the seat bottom 12 and the seat back 14 to pivot about the pin 30 between the seating position and an upright folded position with the seat bottom 12 in a generally vertical plane adjacent the seat back 14. Preferably, the movement between the seating position and the upright folded is best accomplished by placing the seat back 14 in the forward folded position as an intermediate step. Alternatively, this movement can be accomplished directly provided that the seat back 14 is manually supported or supported against an opposing structure, such as a vehicle wall or opposing seat back.

The support shaft 28 is mounted to the shackle 32 for supporting the shackle 32 on the support structure 24 and for rotating the seat bottom 12 in unison with the seat back 14 about a vertical axis A, defined by the center of the support shaft 28, to a transverse stored position. More specifically, a support housing 34 including an aperture 36 is mounted to the support structure 24 for removably receiving the support shaft 28. In addition, a slotted cover 38 is mounted to the support housing 34 covering the aperture 36. The slotted cover 38 includes a circular opening 40 for receiving the support shaft 28, and a slot 42 for receiving a cross bar 44 mounted perpendicularly to the support shaft 28, and parallel to the front 13 and rear 15 portions of the seat bottom 12. The support shaft 28 is installed in the support housing 34 by aligning a conical shaped surface 46 located at the distal end of the support shaft 28 with the circular opening 40. The support shaft 28 is then inserted into the aperture 36 so that the cross bar 44 rests on the slotted cover 38 outside the aperture 36. The cross bar 44 is then aligned with the slot 42 so that the cross bar 44 passes through the slot 42 and is received within the aperture 36. Having installed the cross bar 44 within the aperture 36, the support joint 18 is supported on the slotted cover 38 outside the aperture 36 by a support base 48 secured to the support shaft 28 located above the cross bar 44. As installed, the support shaft 28 is free to rotate within the aperture 36. The slot 42 is positioned at approximately a 45 degree angle in any direction with respect to the front 13, rear 15, inboard side 17 or outboard side 19 portions. The preferred orientation of the slot 42 is based on ergonomic considerations. Consideration factors include whether the seat assembly 10 is designed to be forward or rearward facing in the seating position with respect to a vehicle, as well as, the proximity of the surrounding vehicle components and structure when installing and removing the seat assembly 10. With the seat bottom 12, via the support joint 18, supported on the support base 48, the seat bottom 12 is rotated 45 degrees about the support shaft 28 to a position in alignment with the latch and support bracket mounting locations. In turn, the cross bar 44 is retained within the aperture 36 by the slotted cover 38.

The latch 20, in addition to supporting the seat bottom 12 in the seating position and forward folded positions, secures the seat bottom 12 to the support structure 24 when in either the seating position or the forward folded position, and secures the seat bottom 12 to a storage structure 50 when in the transverse stored position. A variety of latches and mating configurations known to one skilled in the art may be employed. By way of example, the latch 20, as shown in FIG. 3, latches a latch rod 52 disposed within the support structure 24 when the seat bottom is in the seating or forward folded positions. The latch 20 also latches a latch rod 54 disposed within the storage structure 50 when the seat bottom 12 is in the stored position. In the preferred embodiment, the storage structure 50 comprises a vehicle wall 51 known to one skilled in the art as having sufficient structure for supporting the seat assembly 10 under normal vehicle operating conditions.

The support bracket 22 comprises a C-shaped hook 56 that engages a support rod 58 disposed within the support structure 24 when the seat bottom 12 is in the seating or folded forward position, and disengages the seat bottom 12 from the support rod 58 in response to moving the seat bottom 12 and seat back 14 to the upright folded position. From the upright folded position, the seat bottom 12 and seat back 14 are rotated about the support shaft 28 to the stored position. Additionally, the seat assembly 10 can be removed from the support structure 24 when in the upright folded position, by rotating the seat bottom 12 about the support shaft 28 so that the cross bar 44 aligns with the slot 42, and then by lifting the seat bottom 12 upwardly so that the support shaft 28 is removed from the support housing 34.

A release mechanism 60, known to one skilled in the art, is mounted to the seat bottom 12 and interconnects the latch 20 and the locking hinge 16 to release both the latch 20 from the latch rod 52 and the locking hinge 16 when the seat back 14 and the seat bottom 12 are in the seating or forward folded positions. The release mechanism 60 also releases the latch 20 from the latch rod 58 when the seat back 14 and the seat bottom 12 are in the stored position. Alternatively, the locking hinge 16 could be released independently by a locking hinge release mechanism 62 independently mounted to the seat bottom 12.

Releasing the locking hinge 16 allows the seat bottom 12 and seat back 14 to move between the seating position and the forward folded position and vice versa. Releasing the latch 20 allows the seat bottom 12 and seat back 14 to be moved between the seating position and the stored position and vice versa, as well as allowing the seat assembly 10 to be removed from the vehicle.

A seat belt buckle assembly 64 is mounted to the seat bottom 12 adjacent to the support bracket 22 for receiving a seat belt assembly 66.

In operation, the seat assembly 10 is placed in the stored position from the seating position, by first placing the seat assembly 10 in the forward folded position. This is accomplished by first actuating the release mechanism 60, so as to release the locking hinge 16, and then by pivoting the seat back 14 forward adjacent to the seat bottom 12, whereby the seat back 14 is locked in place by the locking hinge 16. From the forward folded position, the seat assembly 10 is then placed in the upright folded position. This step is accomplished by again actuating the release mechanism 60, this time in order to release the latch 20 from the latch rod 52, and then by pivoting the seat bottom upwardly about the pin 30, thereby disengaging the C-shaped hook from the support rod 58. From the upward folded position, the seat assembly is then rotated about the support shaft 28 to the transverse stored position, at which point the latch 20 engages and latches the latch rod 54.

The seat assembly 10 is placed in the seating position from the stored position, by releasing the latch 20 from the latch rod 54 by actuation of the release mechanism 60, then reversing the sequence as described hereinabove so as to place the seat assembly 10 in the forward folded position, whereby the latch 20 engages and latches the latch rod 52 and the C-shaped hook 56 engages the support rod 58. From the forward folded position, the locking hinge 16 is released, by actuation of the release mechanism 60, and the seat back 14 is pivoted rearward to the seating position, whereby the seat back 14 is locked in place by the locking hinge 16.

The seat assembly 10 is removed from the vehicle by placing the seat assembly in the upright folded position. From the upright folded position, the seat bottom 12 is rotated about the support shaft 28 so that cross bar 44 aligns with the slot 42. Having aligned the crossbar 44 with the slot 42, the seat bottom 12 is then lifted upward so that the support shaft 28 clears the slotted cover 38 thereby removing the seat assembly 10 from the vehicle floor 25. The seat assembly 10 is then free to be removed from the vehicle through an available door or tailgate opening.

The seat assembly 10 is installed in the vehicle floor 25 by inserting the support shaft 28 and cross bar 44 into the support housing 34 as previously described.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A seat assembly comprising;

a generally horizontal seat bottom and a generally vertical seat back operatively connected to said seat bottom for defining a seating position, a support joint attached to said seat bottom for supporting said seat bottom on a support structure and for allowing said seat bottom and said seat back to move between said seating position and an upright folded position with said seat bottom in a generally vertical plane adjacent said seat back and for rotating said seat bottom in unison with said seat back about a vertical axis to a transverse stored position, and a latch secured to said seat bottom for latching said seat bottom to the support structure when in said seating position and for latching said seat bottom to a storage structure when in said transverse stored position.

2. A seat assembly as set forth in claim 1 wherein said seat bottom includes a front portion and a rear portion with opposing inboard and outboard side portions interconnecting said front and rear portions, said latch being mounted adjacent to said front portion and between said inboard and outboard side portions for supporting said seat bottom when in said seating position.

3. A seat assembly set forth in claim 1 further including a latch release mechanism mounted to said seat bottom for releasing said latch from the support structure when in said seating position and for releasing said latch from the storage structure when in said stored position.

4. A seat assembly as set forth in claim 1 further including a support bracket mounted to said seat bottom for supporting said seat bottom in said seating position and for disengaging said seat bottom from the support structure in response to moving said seat bottom and seat back to said upright folded position.

5. A seat assembly as set forth in claim 4 wherein said support bracket comprises a C-shaped hook mounted to said seat bottom.

6. A seat assembly as set forth in claim 1 wherein said support joint comprises a pin supported by said seat bottom and a U-shaped shackle pivotally mounted to said pin for pivoting said seat bottom and said seat back between said seating position and said upright folded position.

7. A seat assembly as set forth in claim 6 wherein said support joint further includes an elongated shaft extending from said shackle for supporting said joint on the support structure and for rotating said seat assembly about a vertical axis between said upright folded position and said transverse stored position.

8. A seat assembly as set forth in claim 1 further including a locking hinge interconnecting said seat back and said seat bottom for locking said seat back and said seat bottom in each of said seating and said upright folded position.

9. A seat assembly as set forth in claim 8 further including a release mechanism mounted to said seat bottom for releasing both said latch from the support structure and said locking hinge when said seat back and said seat bottom are in said seating position and for releasing said latch from the storage structure when said seat back and said seat bottom are in said stored position.

10. A seat assembly as set forth in claim 8 further including a locking hinge release mechanism for releasing said locking hinge and allowing said seat back and said seat bottom to move between said seating position and said upright folded position.

11. A seat assembly as set forth in claim 1 wherein said seat bottom includes a front portion and a rear portion with opposing inboard and outboard side portions interconnecting said front and rear portions, said support joint mounted in an outboard corner adjacent said rear and said outboard side portions.

12. A seat assembly as set forth in claim 11 further including a support bracket mounted to said seat bottom in an inboard corner adjacent said rear and said inboard side portions for supporting said seat bottom on the support structure in said seating position and for disengaging said seat bottom from the support structure in response to moving said seat bottom and seat back to said upright folded position.

13. A seat assembly as set forth in claim 12 including a seat belt buckle assembly mounted to said seat bottom adjacent to said support bracket for receiving a seat belt.

14. A seat assembly as set forth in claim 1 further including a support housing for receiving and mounting said support joint to a vehicle floor.

15. A seat assembly as set forth in claim 14 wherein said support joint comprises a support shaft for installing said seat bottom to said support housing.

16. A seat assembly as set forth in claim 15 wherein said support housing includes an aperture for receiving said support shaft.

17. A seat assembly as set forth in claim 16 further including a cross bar mounted perpendicular to said support shaft.

18. A seat assembly as set forth in claim 17 wherein said housing includes a slotted cover for receiving and retaining said cross bar in said support housing.

* * * * *